United States Patent
Cha et al.

(10) Patent No.: US 10,853,230 B2
(45) Date of Patent: Dec. 1, 2020

(54) METHOD FOR AUTOMATICALLY GENERATING SEARCH HEURISTICS AND PERFORMING METHOD OF CONCOLIC TESTING USING AUTOMATICALLY GENERATED SEARCH HEURISTICS

(71) Applicant: Korea University Research and Business Foundation, Seoul (KR)

(72) Inventors: Sooyoung Cha, Seoul (KR); Seongjoon Hong, Seoul (KR); Junhee Lee, Seoul (KR); Hakjoo Oh, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 16/860,382

(22) Filed: Apr. 28, 2020

(65) Prior Publication Data

US 2020/0257617 A1    Aug. 13, 2020

Related U.S. Application Data

(62) Division of application No. 15/985,899, filed on May 22, 2018, now Pat. No. 10,678,680.

(30) Foreign Application Priority Data

Feb. 20, 2018    (KR) .................. 10-2018-0019937

(51) Int. Cl.
*G06F 11/36*    (2006.01)
*G06F 17/50*    (2006.01)
*G06F 9/44*    (2018.01)
*G06F 9/50*    (2006.01)

(52) U.S. Cl.
CPC ...... *G06F 11/3684* (2013.01); *G06F 11/3664* (2013.01); *G06F 11/3688* (2013.01)

(58) Field of Classification Search
CPC ............... G06F 16/24575; G06F 9/245; G06F 11/3684; G06F 11/3664; G06F 11/3688; G06F 11/3676; G06F 11/261; G06F 30/33; G06N 20/00
See application file for complete search history.

(56) References Cited

U.S. PATENT DOCUMENTS

| | | | |
|---|---|---|---|
| 8,799,713 B2 | 8/2014 | Gangasani et al. | |
| 9,104,815 B1 * | 8/2015 | Cohen | G06F 11/3672 |
| 9,529,697 B1 * | 12/2016 | Aldrich | G06F 11/3668 |
| 9,672,355 B2 | 6/2017 | Titonis et al. | |
| 9,996,617 B2 | 6/2018 | Hassan et al. | |
| 10,261,991 B2 | 4/2019 | Moskowitz et al. | |
| 10,318,552 B2 | 6/2019 | Baughman et al. | |
| 10,410,111 B2 | 9/2019 | Husain | |
| 10,438,111 B2 * | 10/2019 | Iscoe | G06N 3/04 |

(Continued)

OTHER PUBLICATIONS

Zhou et al., Path constraint solving based test generation for observability-enhanced branch coverage, 6 pages (Year: 2016).*

(Continued)

*Primary Examiner* — Thuy Dao
(74) *Attorney, Agent, or Firm* — NSIP Law

(57) ABSTRACT

Provided is a method for automatically generating a search heuristic that is optimal for a test subject program and a method of concolic testing that uses a parameterized search heuristic to yield a consistent test performance for any program.

4 Claims, 17 Drawing Sheets

(56) References Cited

U.S. PATENT DOCUMENTS 10,523,609 B1   12/2019   Subramanian
10,705,943 B2 *  7/2020   Makkar .................... G06F 8/36

OTHER PUBLICATIONS

Acharya et al., Branch guided functional test generation at the RTL, 6 pages (Year: 2015).*

Kim et al. "Comparison of Search Strategies of KLEE Concolic Testing Tool." *Journal of KIISE*: Computing Practices and Letters, vol. 18, Issue 4, 2012, pp. 321-325.

Islam et al., "A machine learning framework for performance coverage analysis of proxy applications," 12 pages (Year: 2016).

* cited by examiner

Concolic Testing Algorithm

Input : Program P, initial input vector $v_0$, budget N
Output : The number of branches covered 1 : $T \leftarrow \langle\rangle$
2 : $v \leftarrow v_0$
3 : for m = 1 to N do
4 :     $\Phi_m \leftarrow$ RunProgram(P,v)
5 :     $T \leftarrow T \cdot \Phi_m$
6 :     repeat
7 :        $(\Phi, \varphi_i) \leftarrow$ Choose(T)    $(\Phi = \varphi_i \wedge \cdots \wedge \varphi_n)$
8 :     until SAT $(\wedge_{j<i} \varphi_j \wedge \neg \varphi_i)$
9 :     $v \leftarrow$ model $(\wedge_{j<i} \varphi_j \wedge \neg \varphi_i)$
10 : end for
11 : return $|$Branches(T)$|$ (Choose(T) — Parameterized search heuristic inserted)

FIG. 3

| | # | Description |
|---|---|---|
| Static features | 1 | branch in the main function |
| | 2 | true branch of a loop |
| | 3 | false branch of a loop |
| | 4 | nested branch |
| | 5 | branch containing external function calls |
| | 6 | branch containing integer expressions |
| | 7 | branch containing constant strings |
| | 8 | branch containing pointer expressions |
| | 9 | branch containing local variables |
| | 10 | branch inside a loop body |
| | 11 | true branch of a case statement |
| | 12 | flase branch of a case statement |
| Dynamic features | 13 | first 10% branches of a path |
| | 14 | last 10% branches of a path |
| | 15 | branch appearing most frequently in a path |
| | 16 | branch appearing least frequently in a path |
| | 17 | branch newly covered in the previous execution |
| | 18 | branch located right after the just-negated branch |
| | 19 | branch whose context ($k = 1$) is already visited |
| | 20 | branch whose context ($k = 2$) is already visited |
| | 21 | branch whose context ($k = 3$) is already visited |
| | 22 | branch whose context ($k = 4$) is already visited |
| | 23 | branch whose context ($k = 5$) is already visited |
| | 24 | branch negated more than 10 times |
| | 25 | branch negated more than 20 times |
| | 26 | branch negated more than 30 times |
| | 27 | branch near the just-negated branch |
| | 28 | branch failed to be negated more than 10 times |
| | 29 | the opposite branch failed to be negated more than 10 times |
| | 30 | the opposite branch is uncovered (depth 0) |
| | 31 | the opposite branch is uncovered (depth 1) |
| | 32 | branch negated in the last 10 executions |
| | 33 | branch negated in the last 20 executions |
| | 34 | branch negated in the last 30 executions |
| | 35 | branch in the function that has the largest number of uncovered branchs |
| | 36 | the opposite branch belongs to unreached functions (top 10% of the largest func.) |
| | 37 | the opposite branch belongs to unreached functions (top 20% of the largest func.) |
| | 38 | the opposite branch belongs to unreached functions (top 30% of the largest func.) |
| | 39 | the opposite branch belongs to unreached functions (# of branches > 10) |
| | 40 | branch inside the most recently reached function |

FIG. 5

| Parameter optimization algorithm |
|---|
| Input : Program P |
| Output : Optimal parameter $\theta \in R^k$ for P |
| 1 : /* k : the dimension of $\theta$ */ |
| 2 : initialize the sample spaces $R_i = [-1, 1]$ for $i \in [1, k]$ |
| 3 : <max, converge> ← <0, false> |
| 4 : repeat |
| 5 :     /* Step 1 : Find */ |
| 6 :     /* sample n parameters : $\theta_1, \ldots, \theta_n$ (e.g., n=1,000) */ |
| 7 :     $\{\theta_i\}_{i=1}^{n}$ ← sample from $R_1 \times R_2 \times \ldots \times R_k$ |
| 8 :     /* evaluate the sampled parameters */ |
| 9 :     for i = 1 to n do |
| 10 :        /* $B_i$ : branch coverage achieved with $\theta_i$ */ |
| 11 :        $B_i$ ← C(P, Choose$_{\theta_i}$) |
| 12 :     end for |
| 13 :     pick top K parameters $\{\theta_i'\}_{i=1}^{K}$ from $\{\theta_i\}_{i=1}^{n}$ with highest $B_i$ |
| 14 : |
| 15 :     /* Step 2 : Check */ |
| 16 :     for all K parameters $\theta_i'$ do |
| 17 :        $B_i^* \leftarrow \frac{1}{10}\sum_{j=1}^{10}$ C(P, Choose$_{\theta_i'}$) |
| 18 :     end for |
| 19 :     pick top 2 parameters $\theta_{t1}, \theta_{t2}$ with highest $B_i^*$ |
| 20 : |
| 21 :     /* Step 3 : Refine */ |
| 22 :     for i = 1 to k do |
| 23 :        if $\theta_{t1}^i > 0$ and $\theta_{t2}^i > 0$ then |
| 24 :           $R_i = [\min(\theta_{t1}^i, \theta_{t2}^i), 1]$ |
| 25 :        else if $\theta_{t1}^i < 0$ and $\theta_{t2}^i < 0$ then |
| 26 :           $R_i = [-1, \max(\theta_{t1}^i, \theta_{t2}^i)]$ |
| 27 :        end if |
| 28 :     end for |
| 29 :     /* Check convergence */ |
| 30 :     if $B_{t1}^* <$ max then |
| 31 :        converge ← true |
| 32 :     else |
| 33 :        <max, $\theta_{max}$> ← <$B_{t1}^*, \theta_{t1}$> |
| 34 :     end if |
| 35 : until converge |
| 36 : return $\theta_{max}$ |

FIG. 8

METHOD FOR AUTOMATICALLY GENERATING SEARCH HEURISTICS AND PERFORMING METHOD OF CONCOLIC TESTING USING AUTOMATICALLY GENERATED SEARCH HEURISTICS

CROSS-REFERENCE TO RELATED APPLICATIONS

This application is a divisional of U.S. patent application Ser. No. 15/985,899 filed May 22, 2018, which claims the benefit under 35 U.S.C. 119(a) of Korean Patent Application No. 10-2018-0019937 filed Feb. 20, 2018, in the Korean Intellectual Property Office, the disclosures of which are incorporated herein by reference for all purposes.

BACKGROUND

1. Technical Field

The present invention relates to concolic testing, more particularly to a method for automatically generating a search heuristic and a method of concolic testing using an automatically generated search heuristic.

2. Description of the Related Art

Concolic testing is a technique of testing a given software by performing concrete execution and symbolic execution simultaneously. Although it is known to be much more effective than random testing, concolic testing does entail the problem of path explosion, in which the search space of the software becomes infinitely large. To avoid this problem, the use of a 'search heuristic' has been proposed, which is to set levels of priority for the paths that will be searched. The goal of a search heuristic is to execute as many portions of the subject software code as possible within the given time. More specifically, the goal of a search heuristic is to maximize the branch coverage of the subject software within a given amount of time.

Devising a search heuristic for concolic testing is extremely important but also very difficult. Various new search heuristics are being published continuously in major academic societies to address this problem. However, search heuristics have typically been devised by experts manually. Moreover, the search heuristics devised by experts do not consistently show high performance in testing arbitrary software codes. In other words, the search heuristics devised by experts may show high performance only with specific types of software and show lower performance with other types of software.

SUMMARY OF THE INVENTION

To address the technical problem described above, an objective of the present invention is to provide a method for automatically generating a search heuristic that is optimal for a test subject program.

Another objective of the invention is to provide a method of concolic testing that uses a parameterized search heuristic to yield a consistent test performance for any program.

An embodiment of the invention provides a method for automatically generating a search heuristic to be used in a concolic testing of a subject program, where the method can include: (a) generating feature vectors that correspond to branches included in the subject program and initializing sample spaces that correspond respectively to the dimensions of the feature vectors; (b) randomly generating first parameter vectors, which have the same dimensions as the feature vectors and contain components selected respectively from the sample spaces; (c) selecting second parameter vectors from among the first parameter vectors based on the size of a first branch coverage of each first parameter vector for the subject program; (d) reducing the sample spaces individually based on an average branch coverage of each of the second parameter vectors for the subject program; (e) repeating steps (b) to (d) such that the average branch coverage of some of the second parameter vectors converges to a maximum; and (f) when the average branch coverage converges to a maximum, outputting an optimal parameter vector corresponding to the maximum average branch coverage, where the components of the first parameter vectors can be selected from the sample spaces individually reduced in step (d) when step (b) is repeated.

Another embodiment of the invention provides a method of concolic testing that can include: inputting a subject program and an initial input; repeating the subject program execution by a set number of times based on the initial input and a parameterized search heuristic; and outputting the branch coverage for the subject program, where the parameterized search heuristic can include: generating feature vectors corresponding respectively to branches included in the subject program; calculating branch scores corresponding respectively to the branches by way of scalar products between the feature vectors and a predetermined parameter vector; and selecting a branch corresponding to a maximum value of the branch scores, and where the parameter vector can be determined by a method for automatically generating a search heuristic based on the subject program.

An embodiment of the invention can provide a consistent test performance for any program when performing concolic testing by using a parameterized search heuristic.

Also, embodiment of the invention can automatically generate an optimal search heuristic corresponding to a test subject program for concolic testing.

Additional aspects and advantages of the present invention will be set forth in part in the description which follows, and in part will be obvious from the description, or may be learned by practice of the invention.

BRIEF DESCRIPTION OF THE DRAWINGS

FIG. 3 shows a general concolic testing algorithm.

FIG. 5 shows examples of branch features for determining the feature vectors of FIG. 4.

FIG. 8 shows a parameter optimization algorithm according to an embodiment of the invention.

DETAILED DESCRIPTION OF THE INVENTION

Disclosed hereinafter are exemplary embodiments of the present invention. Particular structural or functional descriptions provided for the embodiments hereafter are intended merely to describe embodiments according to the concept of the present invention. The embodiments are not limited as to a particular embodiment.

Terms such as "first" and "second" may be used to describe various parts or elements, but the parts or elements should not be limited by the terms. The terms may be used to distinguish one element from another element. For instance, a first element may be designated as a second element, and vice versa, while not departing from the extent of rights according to the concepts of the present invention.

Unless otherwise clearly stated, when one element is described, for example, as being "connected" or "coupled" to another element, the elements should be construed as being directly or indirectly linked (i.e., there may be an intermediate element between the elements). Similar interpretation should apply to such relational terms as "between", "neighboring," and "adjacent to."

Terms used herein are used to describe a particular exemplary embodiment and should not be intended to limit the present invention. Unless otherwise clearly stated, a singular term denotes and includes a plurality. Terms such as "including" and "having" also should not limit the present invention to the features, numbers, steps, operations, sub-parts and elements, and combinations thereof, as described; others may exist, be added or modified. Existence and addition as to one or more of features, numbers, steps, etc. should not be precluded.

Unless otherwise clearly stated, all of the terms used herein, including scientific or technical terms, have meanings which are ordinarily understood by a person skilled in the art. Terms, which are found and defined in an ordinary dictionary, should be interpreted in accordance with their usage in the art. Unless otherwise clearly defined herein, the terms are not interpreted in an ideal or overly formal manner.

Hereinafter, exemplary embodiments of the present invention are described in detail with reference to the accompanying drawings.

Figure 1:
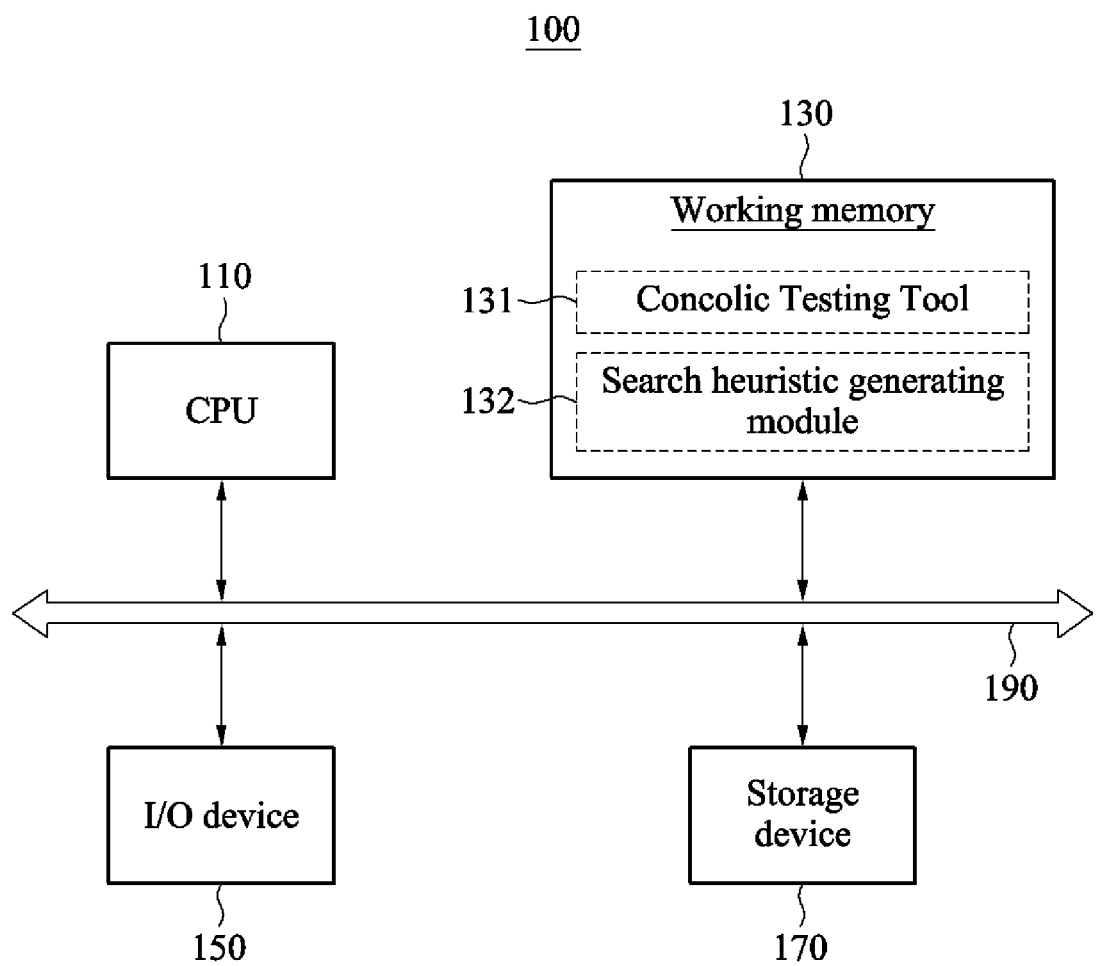
FIG. 1 is a block diagram illustrating a concolic testing system according to an embodiment of the invention.

FIG. 1 is a block diagram illustrating a concolic testing system according to an embodiment of the invention. Referring to FIG. 1, a concolic testing system 100 can include a central processing unit 110, a working memory 130, an input/output device 150, a storage device 170, and a system bus 190. Here, the concolic testing system 100 can be provided as a device dedicated to performing concolic testing but can also be a computer for operating various program testing tools.

The central processing unit 110 may execute the software (such as application programs, operating systems, device drivers, etc.) that is to be performed on the concolic testing system 100. The central processing unit 110 may execute an operating system (not shown) loaded into the working memory 130. The central processing unit 110 may execute various application programs or program testing tools that may be operated over the operating system (OS). For example, the central processing unit 110 can operate a concolic testing tool 131 and a search heuristic generating module 132 loaded into the working memory 130.

The working memory 130 may have an operating system (OS) or application programs loaded thereinto. When the concolic testing system 100 is booted, an OS image (not shown) stored in the storage device 170 may be loaded into the working memory 130 according to the booting sequence. The overall inputting and outputting operations of the concolic testing system 100 can be supported by the operating system (OS). Similarly, application programs that are selected by the user or are used for providing basic services can be loaded into the working memory 130. In particular, the concolic testing tool 131 and search heuristic generating module 132 of the invention can be loaded into the working memory 130. The working memory 130 can be volatile memory such as SRAM (static random access memory) or DRAM (dynamic random access memory) or nonvolatile memory such as PRAM, MRAM, ReRAM, FRAM, NOR flash memory, etc.

The concolic testing tool 131 can perform concolic testing on a subject program by using a parameterized search heuristic (PSH). The subject program is the program that is to be tested. For example, the concolic testing tool 131 can execute the subject program a set number of times (e.g. 4000 times) before outputting the branch coverage. The branch coverage refers to the number of branches that were covered during performing concolic testing from among all of the branches included in the subject program (For example, 1800 branches may be covered during the 4000 executions of the subject program.). Generally, a search heuristic can be defined as selecting a branch at every execution of a subject program such that a branch is selected from among a set of branches that were passed over during an execution of the subject program. Such selection of a branch is for determining the area of the subject program that will be searched next. A parameterized search heuristic (PSH) according to an embodiment of the invention is to determine the selection of branches based on set parameter values. For example, the concolic testing tool 131 can include CREST, SAGE, etc.

The search heuristic generating module 132 can generate the parameterized search heuristic (PSH) that is to be used by the concolic testing tool 131. For example, the parameterized search heuristic (PSH) may include generating feature vectors that correspond respectively to the branches of the subject program and calculating branch scores by obtaining scalar products between the feature vectors and a predetermined parameter vector. The parameterized search heuristic (PSH) may include selecting a branch that yields the highest branch score during the concolic testing. To perform the parameterized search heuristic, an optimal parameter vector is required. The search heuristic generating module 132 can determine the optimal parameter vector by way of a search heuristic generating algorithm and transfer it to the concolic testing tool 131. A more detailed description of the search heuristic generating algorithm will be described later on with reference to FIG. 8 and FIG. 9.

The input/output device 150 may control the user input and output of the user interface devices. For example, the input/output device 150 can receive input of files needed for concolic testing or information needed for generating a search heuristic by way of an input device such as a keyboard, mouse, touchpad, and the like. The input/output device 150 can also display the progress, processing results, etc., of the test operations of the concolic testing system 100 by way of an output device such as a monitor, etc.

The storage device 170 may be provided as a storage medium for the concolic testing system 100. The storage device 170 can store application programs, OS images, and various data. Also, the storage device 170 can store the concolic testing tool 131, the search heuristic generating module 132, data required for conducting the concolic testing, and data generated by the concolic testing. The storage device 170 can also be provided as a memory card (MMC, eMMC, SD, MicroSD, etc.) or a hard disk drive (HDD). The storage device 170 can include a NAND-type flash memory, which has a large storage capacity. In some examples, the storage device 170 can include next-generation nonvolatile memory such as PRAM, MRAM, ReRAM, FRAM, etc., or NOR flash memory.

The system bus 190 may be provided as an interconnector for providing a network within the concolic testing system 100. By way of the system bus 190, the central processing unit 110, working memory 130, input/output device 150, and storage device 170 can be electrically connected and are able to exchange data. However, the composition of the system bus 190 is not limited to the descriptions above, and additional means of mediation can further be included for efficient management.

Figure 2:
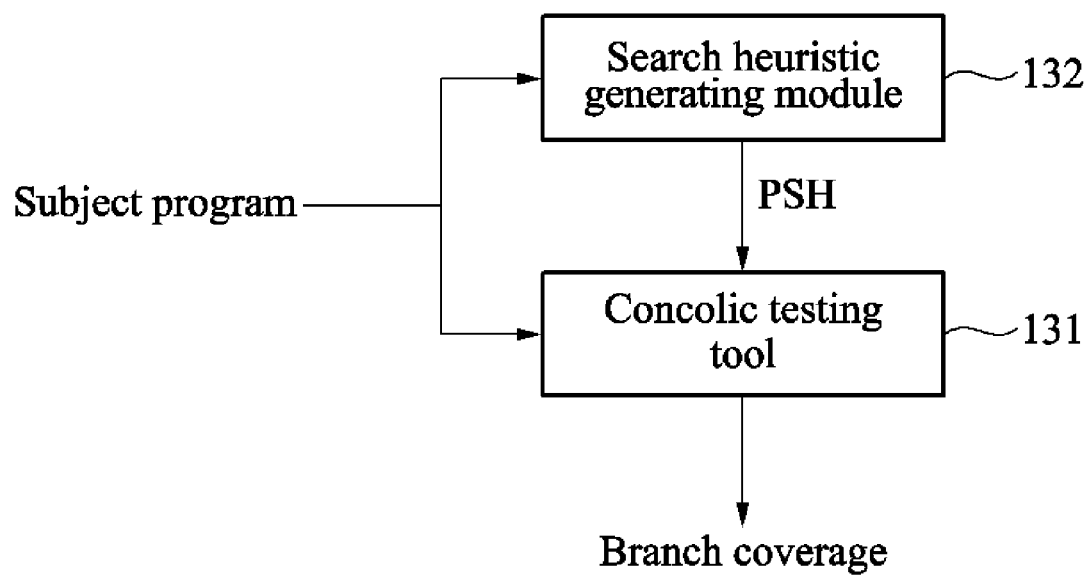
FIG. 2 is a block diagram illustrating the operations of the concolic testing tool and the search heuristic generating module of FIG. 1.

FIG. 2 is a block diagram illustrating the operations of the concolic testing tool and the search heuristic generating module of FIG. 1. FIG. 3 shows a general concolic testing algorithm. Referring to FIG. 2 and FIG. 3, the search heuristic generating module 132 can provide the parameterized search heuristic (PSH) generated automatically based on the subject program to the concolic testing tool 131.

The concolic testing tool 131 can perform concolic testing on the subject program by using the parameterized search heuristic (PSH). For example, the concolic testing tool 131 can receive input of the subject program (P), the initial input vector (v0), and the number of executions (N), when conducting a test. Also, the concolic testing tool 131 can receive the parameterized search heuristic (PSH) from the search heuristic generating module 132. After executing the subject program by the number of executions (N) according to the parameterized search heuristic (PSH), the concolic testing tool 131 can output the branch coverage. The branch coverage refers to the number of branches covered in the subject program that were executed during the concolic testing.

Generally, a search heuristic can be defined as selecting a branch at every execution of a subject program such that a branch is selected from among a set of branches that were passed over during an execution of the subject program. Such selection of a branch is for determining the area of the subject program that will be searched next. The concolic testing tool 131 may select a branch based on the parameterized search heuristic (PSH) and parameter values determined to correspond the subject program. For example, the parameterized search heuristic (PSH) can generate feature vectors that correspond respectively to the branches of the subject program and can calculate branch scores by obtaining scalar products between the feature vectors and a predetermined parameter vector. The parameterized search heuristic (PSH) may mean selecting the branch having the highest branch score when the concolic testing is conducted.

The search heuristic generating module 132 can generate the parameterized search heuristic (PSH) that is to be used by the concolic testing tool 131. For example, the search heuristic generating module 132 can determine an optimal parameter vector by way of a search heuristic generating algorithm and transfer the optimal parameter vector to the concolic testing tool 131. A more detailed description of the search heuristic generating algorithm will be described later on with reference to FIG. 8 and FIG. 9.

According to an embodiment of the invention, the search heuristic generating module 132 can automatically generate a parameterized search heuristic that includes a parameter vector optimized to the subject program. Also, the concolic testing tool 131 can receive the parameterized search heuristic from the search heuristic generating module 132 to conduct concolic testing on the subject program. Thus, a concolic testing system 100 according to an embodiment of the invention can automatically generate a search heuristic optimized to any arbitrary program and can offer a consistent test performance (outputting maximum branch coverage) for any arbitrary program.

Figure 4:
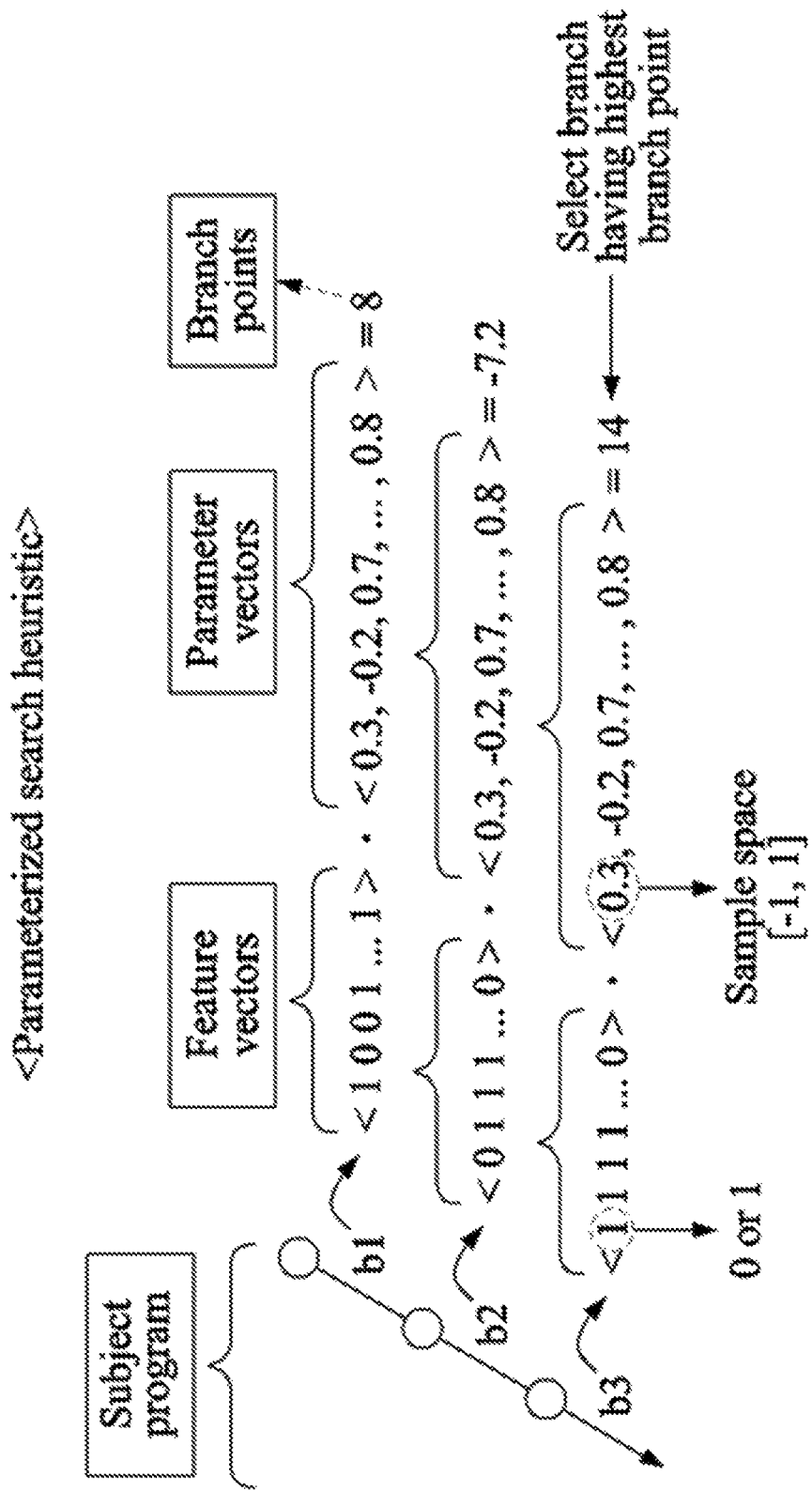
FIG. 4 is a diagram for illustrating a concept associated with a parameterized search heuristic according to an embodiment of the invention.

FIG. 4 is a diagram for illustrating a concept associated with a parameterized search heuristic according to an embodiment of the invention. FIG. 5 shows examples of branch features for determining the feature vectors of FIG. 4. Referring to FIG. 4 and FIG. 5, a parameterized search heuristic can perform branch selection optimized to the subject program.

The subject program can include multiple branches (b1, b2, b3). Although FIG. 4 illustrates only three branches (b1, b2, b3) for the sake of convenience, the number of branches included in the subject program is not limited thus. Each execution of the subject program can proceed along one branch.

A parameterized search heuristic according to an embodiment of the invention can generate feature vectors corresponding to the branches (b1, b2, b3), respectively. The feature vectors can have multiple dimensions. The component for each dimension of a feature vector can be determined based on the branch features of FIG. 5. For example, each branch feature can be a question that can be differentiated as true or false according to the path of the branch. In one example, if a branch has a certain branch feature, then this can be expressed as 1 in the feature vector, and if the branch does not have the branch feature, then this can be expressed as 0 in the feature vector.

The branch features can include static features and dynamic features. A static feature may refer to a branch feature that is determined regardless of whether or not the subject program is executed. For example, a branch feature regarding 'is the branch included in the main function?' would be a static function. In contrast, a dynamic feature may refer to a branch feature that can be modified by the execution of the subject program. For example, a branch feature regarding 'has the branch been newly covered in a previous execution?' would be a dynamic feature, because the true or false of the statement can be changed according to an execution of the subject program.

The dimensions of the feature vectors can be determined according to the number of branch features. For example, the feature vectors can have the same number of dimensions as the number of branch features. The branch features can be determined beforehand and stored in the storage device 170 of FIG. 1. The concolic testing tool 131 of FIG. 1 can reference the branch features to generate the feature vectors of the branches. FIG. 5 illustrates an example having forty branch features. However, the number of branch features is not limited thus. The contents and number of branch features can be changed in various ways for the desired test performance.

The parameterized search heuristic can use a predetermined (i.e. optimized) parameter vector. The parameter vector can be determined, based on the subject program, by the search heuristic generating module 132 of FIG. 1. The parameter vector can have the same dimensions as the feature vectors. The components for the dimensions of the parameter vector can each be selected from a sample space. In one example, a sample space can be defined as a real number from −1 to 1.

The concolic testing tool 131 can calculate a branch score as a scalar product between the feature vector and the parameter vector for each of the branches (b1, b2, b3). The parameterized search heuristic may mean selecting the branch that corresponds to the highest score from among the calculated branch scores. The concolic testing tool 131 can execute the subject program by the set number of execution times. The feature vector of each branch can be modified every time the subject program is executed. This is because the branch features include dynamic features. Thus, the branch scores can be changed with every execution of the subject program, and at every execution, the branch corresponding to the highest branch score can be selected according to the parameterized search heuristic. The concolic testing based on such parameterized search heuristic can perform many branches within the set number of executions and can thus output a large branch coverage. That is, the performance of the concolic testing can be improved by the parameterized search heuristic.

Figure 6:
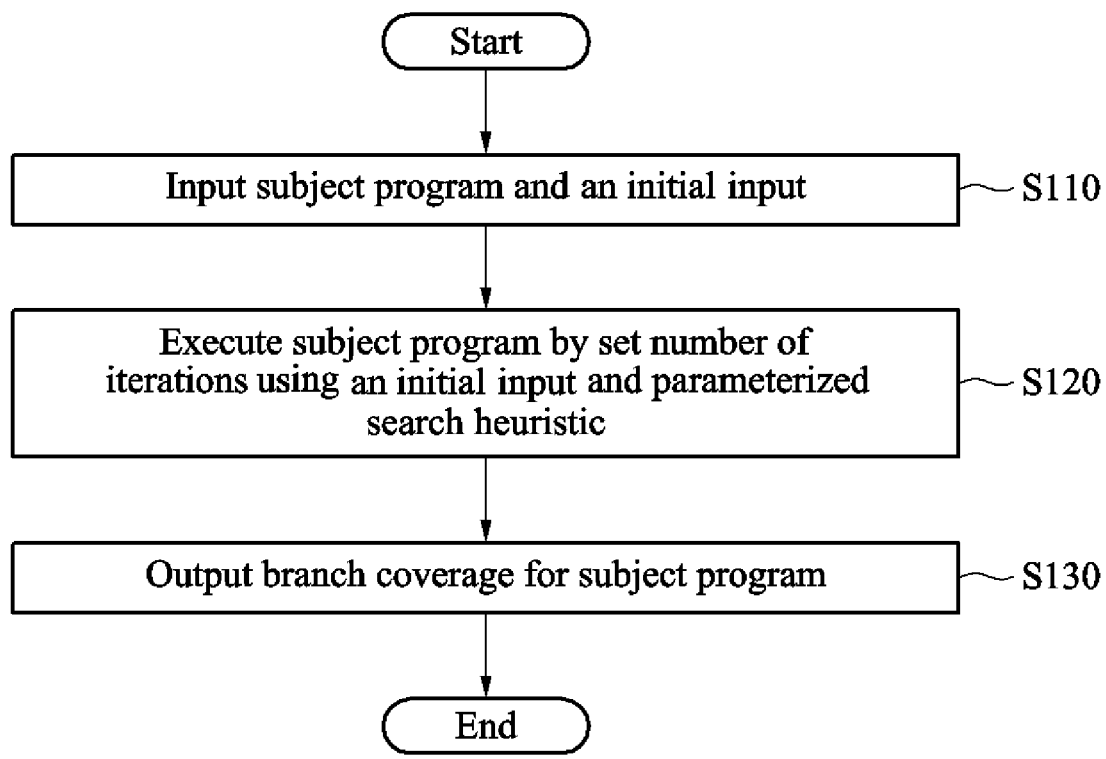
FIG. 6 is a flowchart illustrating a method of concolic testing according to an embodiment of the invention.

FIG. 6 is a flowchart illustrating a method of concolic testing according to an embodiment of the invention. Referring to FIG. 1 and FIG. 6, a concolic testing system 100 can perform concolic testing by using a parameterized search heuristic.

In step S110, the concolic testing system 100 can input the subject program and the initial input to the concolic testing tool 131. For example, concolic testing tool 131 can execute the subject program based on a concolic testing algorithm such as that illustrated in FIG. 3.

In step S120, the concolic testing system 100 can iterate the subject program by the set number of executions using the initial input and the parameterized search heuristic by way of the concolic testing tool 131. For example, the concolic testing tool 131 can receive input of the set number of executions. The concolic testing tool 131 can execute the subject program a set number of execution times. At every execution of the subject program, the concolic testing tool 131 can generate a feature vector for each branch according to the parameterized search heuristic and can calculate the branch score for each branch by taking a scalar product of the feature vector and the parameter vector. The feature vectors and the parameter vector can be generated based on the subject program. The concolic testing tool 131 can select the branch having the highest branch score at every iteration of the subject program.

In step S130, the concolic testing system 100 can output the branch coverage for the subject program. For example, after the subject program is executed by the set execution number, the concolic testing tool 131 can measure the number of executed branches from among the branches included in the subject program.

According to a method of concolic testing according to an embodiment of the invention, the concolic testing system 100 can test the subject program based on a parameterized search heuristic. The parameterized search heuristic can use feature vectors and a parameter vector that were generated based on the subject program. Thus, the concolic testing system 100 can perform a concolic test that is optimized to the subject program. That is, the concolic testing system 100 can achieve a consistent test performance for any arbitrary program.

Figure 7:
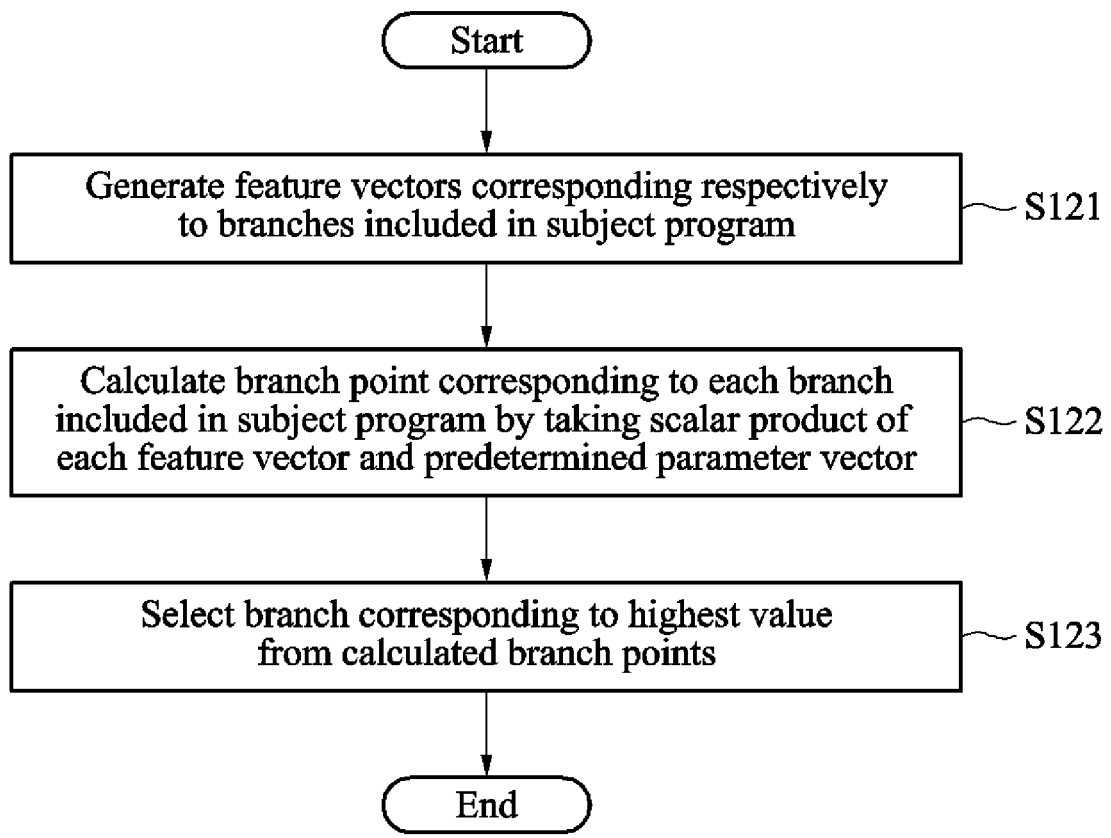
FIG. 7 is a flowchart more specifically detailing the parameterized search heuristic of FIG. 6.

FIG. 7 is a flowchart more specifically detailing the parameterized search heuristic of FIG. 6. Referring to FIG. 1 and FIG. 7, the concolic testing tool 131 can select a branch by way of the parameterized search heuristic with every execution of the subject program. FIG. 7 illustrates the operations of the concolic testing tool 131 during one iteration of the subject program.

In step S121, the concolic testing tool 131 can generate feature vectors corresponding to the branches included in the subject program, respectively. For example, the concolic testing tool 131 can generate the feature vectors based on the branch features of FIG. 5. The component for each dimension of the feature vectors can have a value of 0 or 1. A component for a dimension of a feature vector can have a value of 1, if the corresponding branch has the branch feature, or otherwise have a value of 0, if the branch does not.

In step S122, the concolic testing tool 131 can calculate branch scores corresponding to the respective branches by obtaining scalar products of the generated feature vectors and a predetermined parameter vector. For example, the parameter vector can be determined beforehand by a search heuristic generating module 132. The method of determining the parameter vector will be described later on in further detail with reference to FIG. 8 and FIG. 9.

In step S123, the concolic testing tool 131 can select the branch that corresponds to the highest of the calculated branch scores. For example, the feature vectors can be modified differently at every iteration of the subject program due to dynamic features included among the branch features. Therefore, at every iteration of the subject program, the branch scores corresponding to the branches can be different, and the branch having the highest branch score can be different as well. Ultimately, the concolic testing tool 131 can execute as many branches as possible from among the branches included in the subject program within the set number of executions.

FIG. 8 shows a parameter optimization algorithm according to an embodiment of the invention. Referring to FIG. 1 and FIG. 8, the search heuristic generating module 132 can generate the parameter vector used for the parameterized search heuristic by way of the parameter optimization algorithm shown in FIG. 8. The search heuristic generating module 132 can receive the subject program as input and can generate the parameter vector based on the subject program. The parameter optimization algorithm can include a Find step, a Check step, and a Refine step.

Before the Find step, the search heuristic generating module 132 can initialize the sample space of each dimension of the parameter vector. For example, the parameter vector can have the same dimensions as the feature vectors that correspond respectively to the branches of the subject program. At the onset, the sample space for each dimension of the parameter vector can be set to be real numbers between −1 and 1 ([−1, 1]).

In the Find step, the search heuristic generating module 132 can generate a multiple number of first parameter vectors. For example, the search heuristic generating module 132 can generate a preset number (e.g. 1000) of first parameter vectors. The component for each dimension of each parameter vector can be randomly selected from a sample space (which initially may be [−1, 1]). The search heuristic generating module 132 can measure the branch coverage of the subject program for each of the randomly generated first parameter vectors. That is, the search heuristic generating module 132 can execute the subject program by a set number of iterations (e.g. 4000 times) with each of the first parameter vectors inputted and then measure the first branch coverage for each of the first parameter vectors.

The search heuristic generating module 132 can select a particular number (e.g. 10) of second parameter vectors from the first parameter vectors in order of largest first branch coverage. In one example, the search heuristic generating module 132 can select the second parameter vectors as a particular percentage of first parameter vectors in order of largest first branch coverage (e.g. having the top 10% largest branch coverage). In one example, the search heuristic generating module 132 can select those parameter vectors having sizes of first branch coverage larger than a reference coverage as the second parameter vectors.

In the Check step, the search heuristic generating module 132 can measure the branch coverage by a particular number of times (e.g. 10 times) for each of the selected second parameter vectors and calculate an average of the measured branch coverage values (an average branch coverage for each of the second parameter vector). For example, the search heuristic generating module 132 can input each of the second parameter vectors and execute the subject program by a set number of iterations (e.g. 4000 times) to measure the second branch coverage and can measure the second branch coverage for each of the second parameter vectors by a particular number of times (e.g. 10 times). The search heuristic generating module 132 can calculate the average (i.e. average branch coverage) of the second branch coverage sizes measured by a particular number of times (e.g. 10 times) for each of the second parameter vectors. The search heuristic generating module 132 can select two parameter vectors (a third and a fourth parameter vector) having the largest average branch coverage sizes from among the second parameter vectors.

In the Refine step, the search heuristic generating module 132 can compare the components of each dimension of the selected third and fourth parameter vectors. According to the comparison result, the search heuristic generating module 132 can reduce the sample space for each dimension of the parameter vector. For example, if the components for the same dimension of the third and fourth parameter vectors are both positive, then the lower limit of the sample space can be modified to be the smaller of the two components. If the components for the same dimension of the third and fourth parameter vectors are both negative, then the upper limit of the sample space can be modified to be the greater of the two components. If the components for the same dimension of the third and fourth parameter vectors have different signs, then the sample space can remain unmodified. For example, if it is supposed that the third parameter vector is <0.3, −0.6, 0.7> and the fourth parameter vector is <0.7, −0.2, −0.7>, then the sample space for the first dimension may be changed to [min(0.3, 0.7),]1=[0.3, 1], the sample space for the second dimension may be changed to [−1, max(−0.6, −0.2)]=[−1, −0.2], and the sample space for the third dimension may remain as [−1, 1].

The search heuristic generating module 132 can iterate the Find step, Check step, and Refine step until the average branch coverage of the third and fourth parameter vectors converges to a maximum. For example, the search heuristic generating module 132 can store the maximum average branch coverage and the corresponding parameter vector from a previous iteration. The search heuristic generating module 132 can compare the maximum average branch coverage of the current iteration with the maximum average branch coverage of the previous iteration. If the maximum average branch coverage of the current iteration is greater than the maximum average branch coverage of the previous iteration, then the search heuristic generating module 132 can store the maximum average branch coverage of the current iteration as well as the corresponding parameter vector and can repeat the Find step, Check step, and Refine step. If the maximum average branch coverage of the current iteration is smaller than or equal to the maximum average branch coverage of the previous iteration, then the search heuristic generating module 132 can determine the parameter vector stored from the previous iteration as the final parameter vector and end the parameter optimization algorithm. Thus, the search heuristic generating module 132 can generate an optimal parameter vector for use in the parameterized search heuristic.

Figure 9:
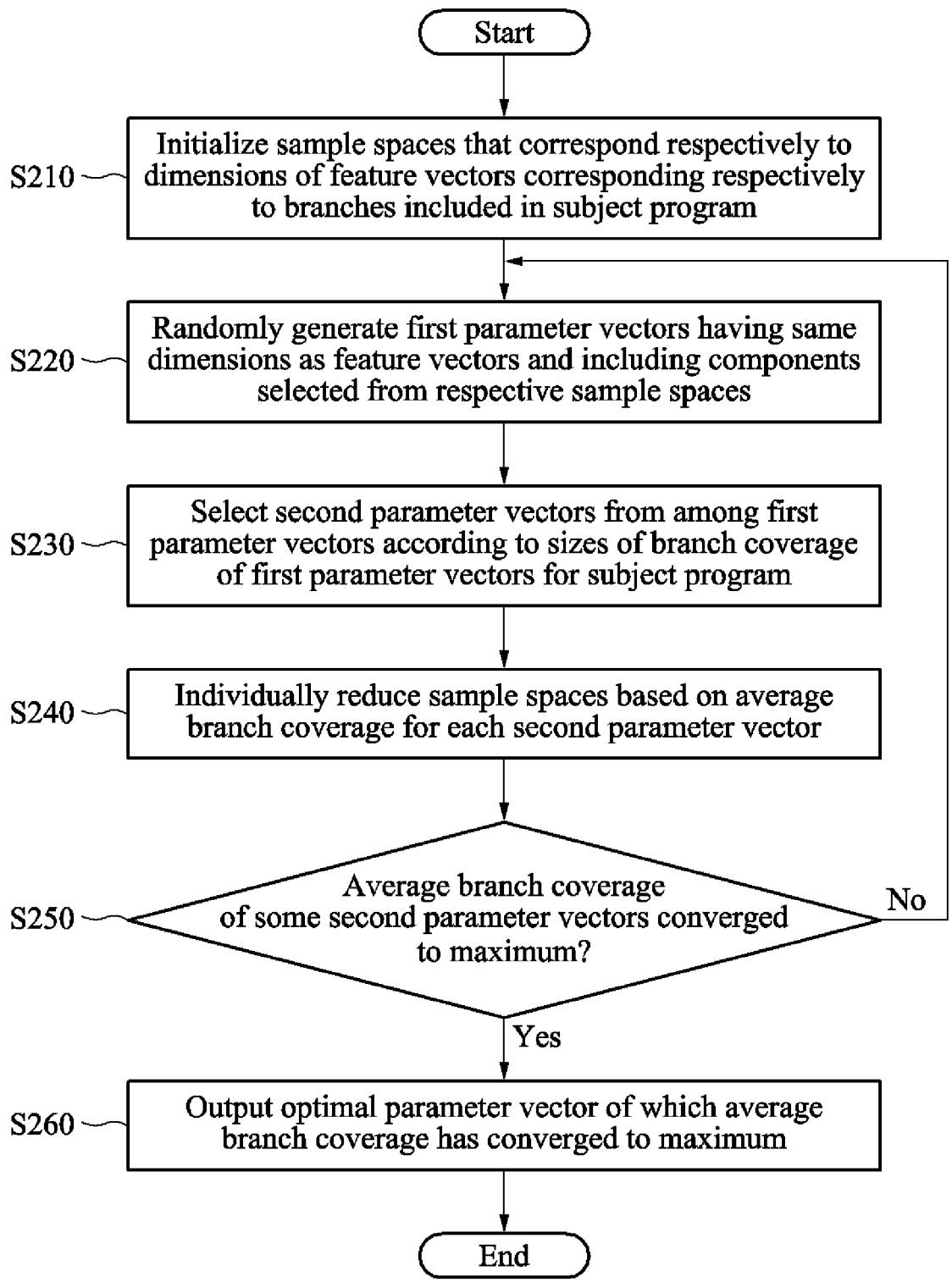
FIG. 9 is a flowchart illustrating a method of generating a search heuristic according to an embodiment of the invention.
Figure 10A:
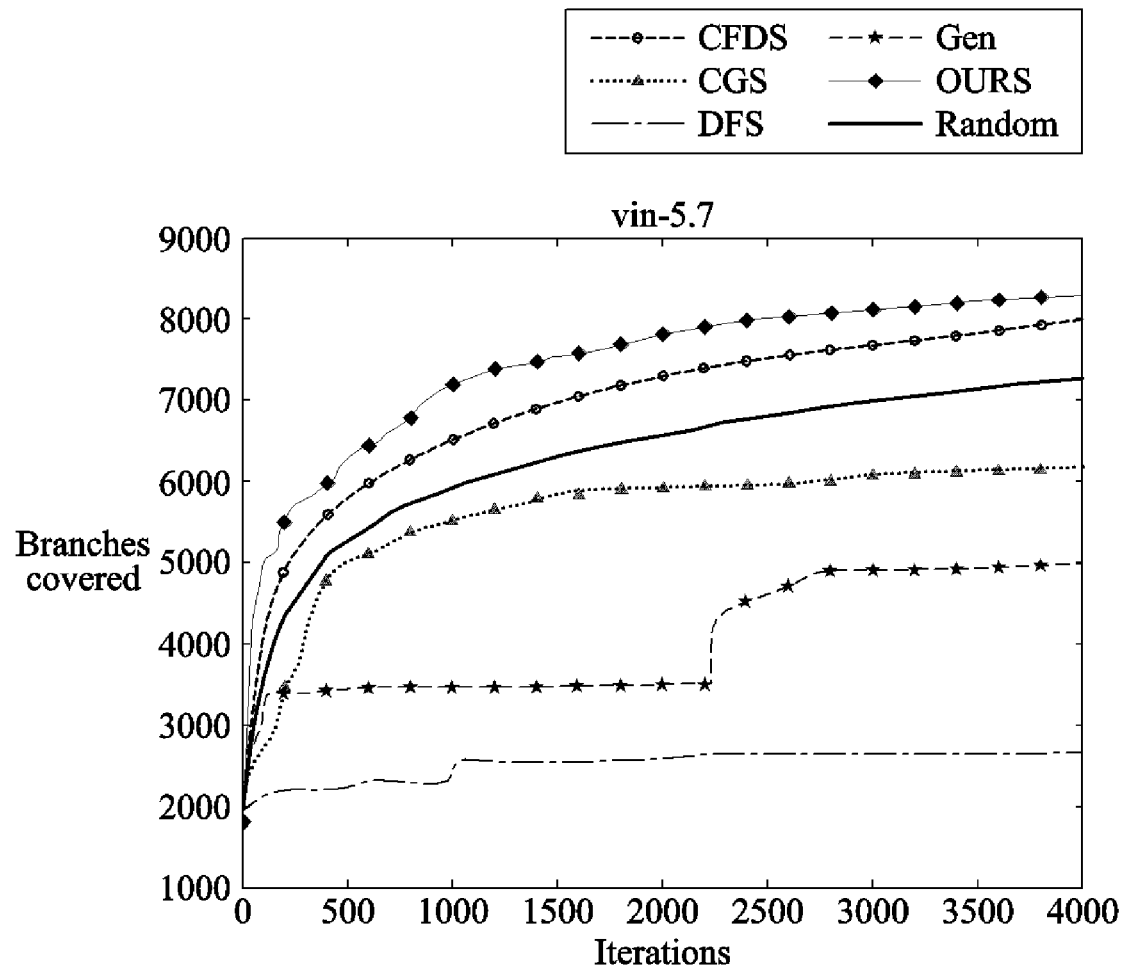
FIG. 10A to 10F show graphs that illustrate the effect of concolic testing using a parameterized search heuristic according to an embodiment of the invention.
Figure 10B:
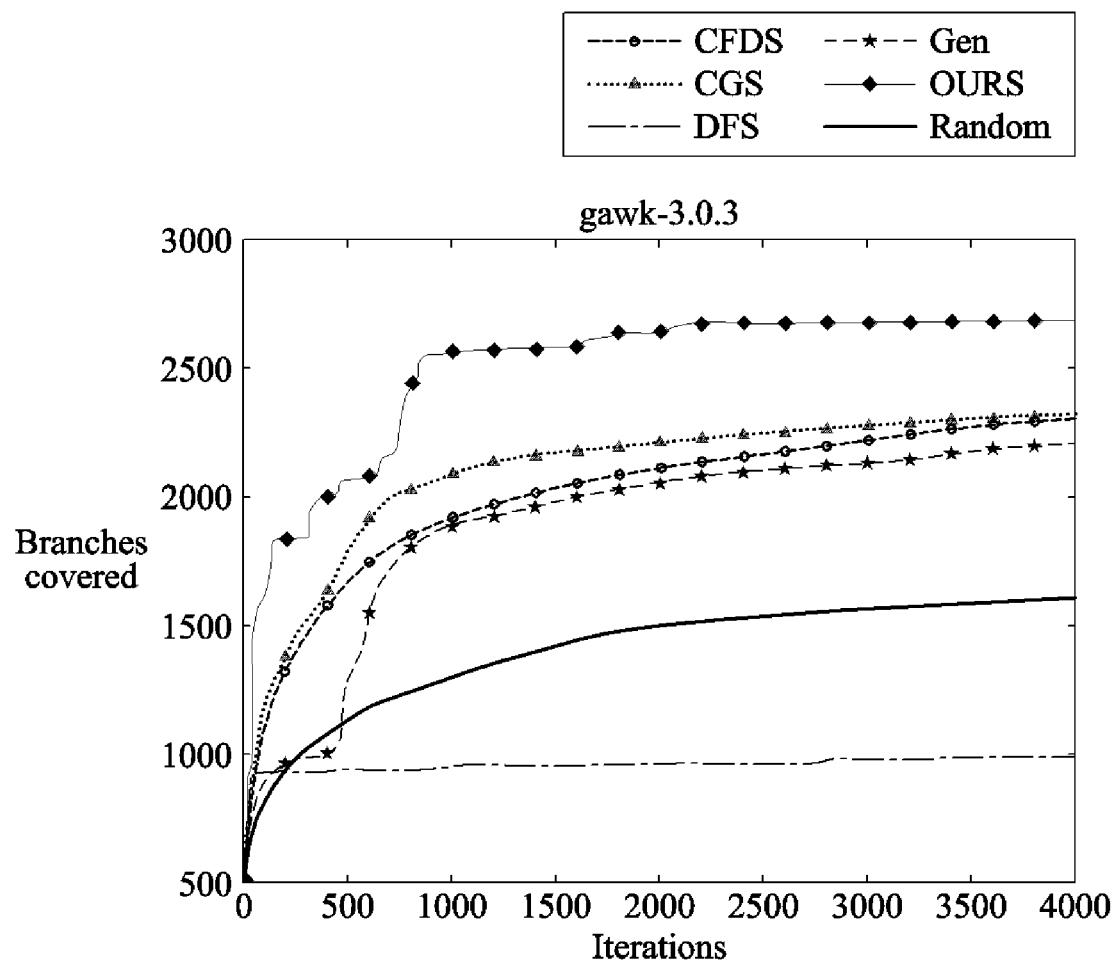
Figure 10C:
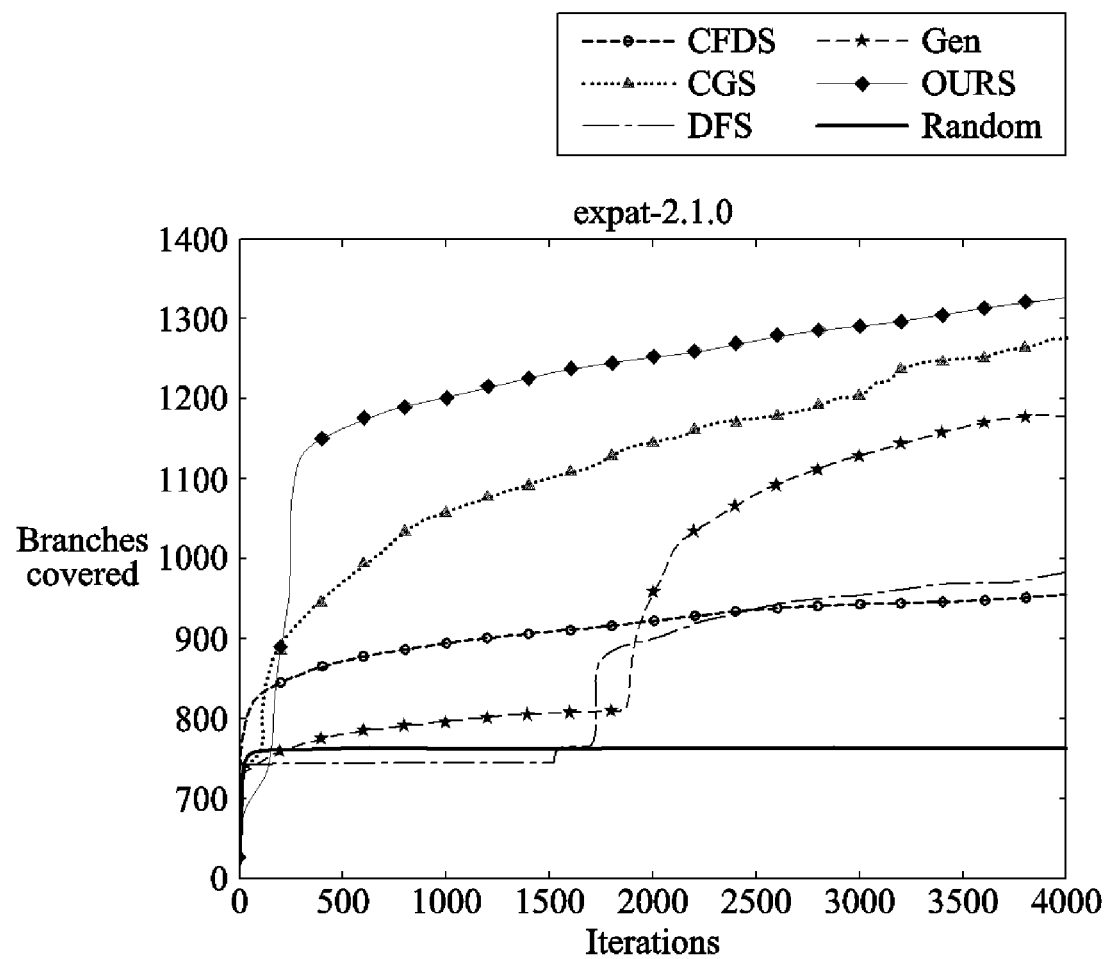
Figure 10D:
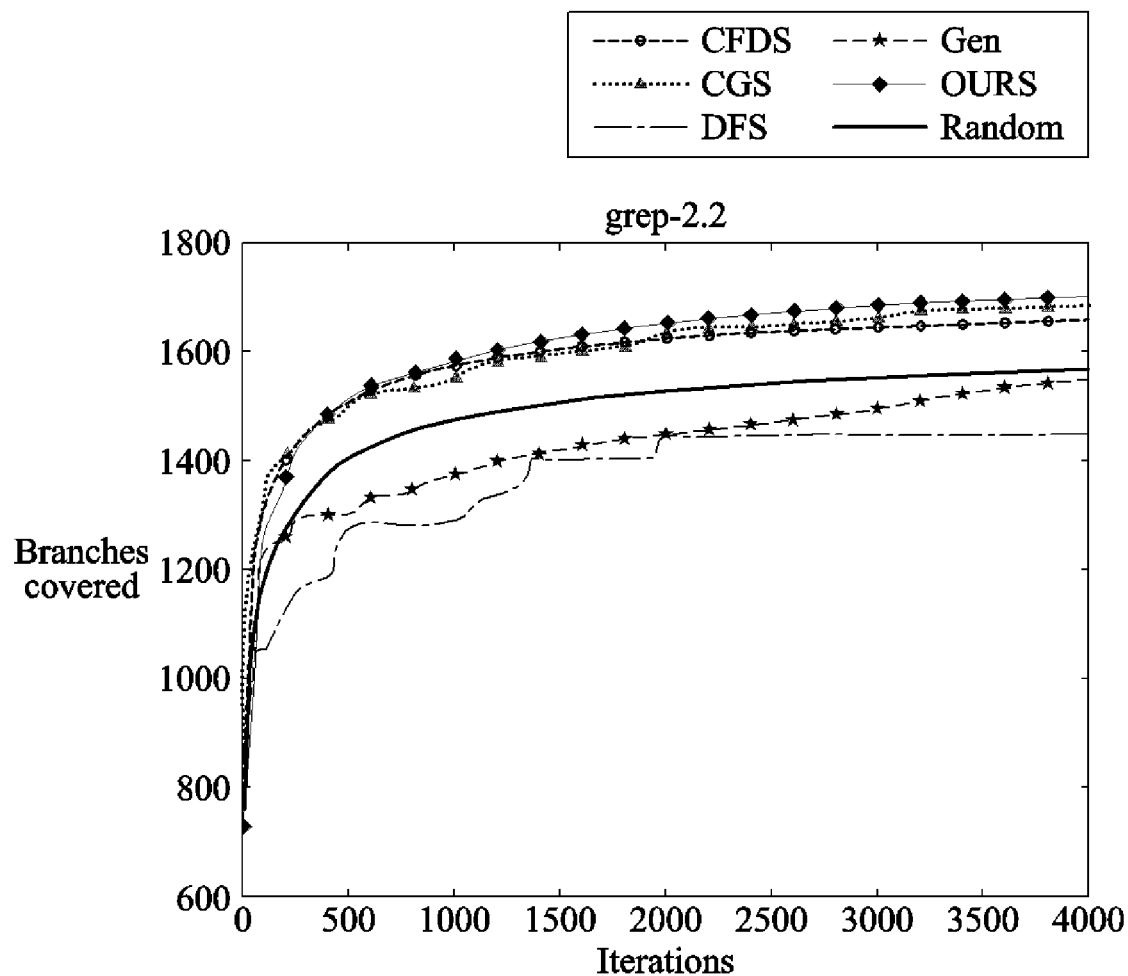
Figure 10E:
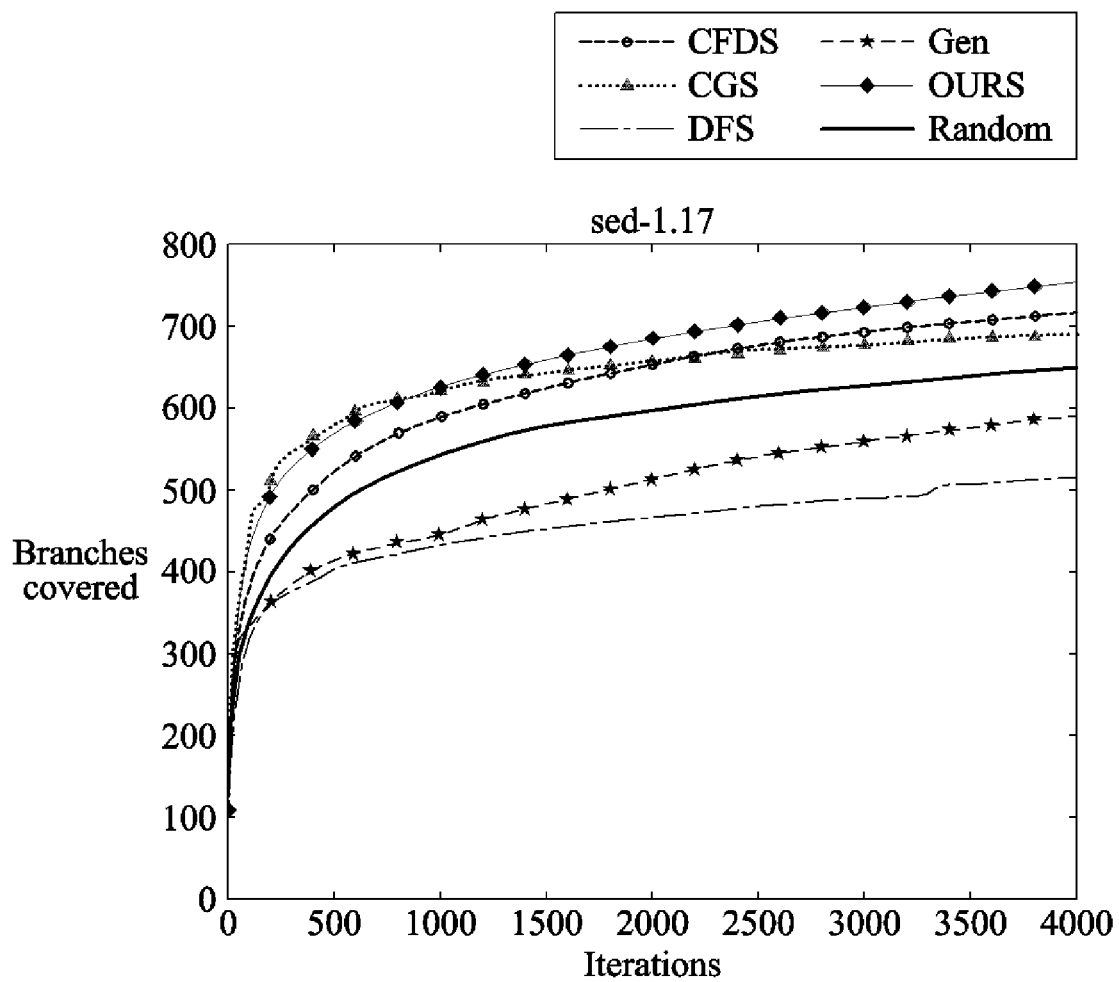
Figure 10F:
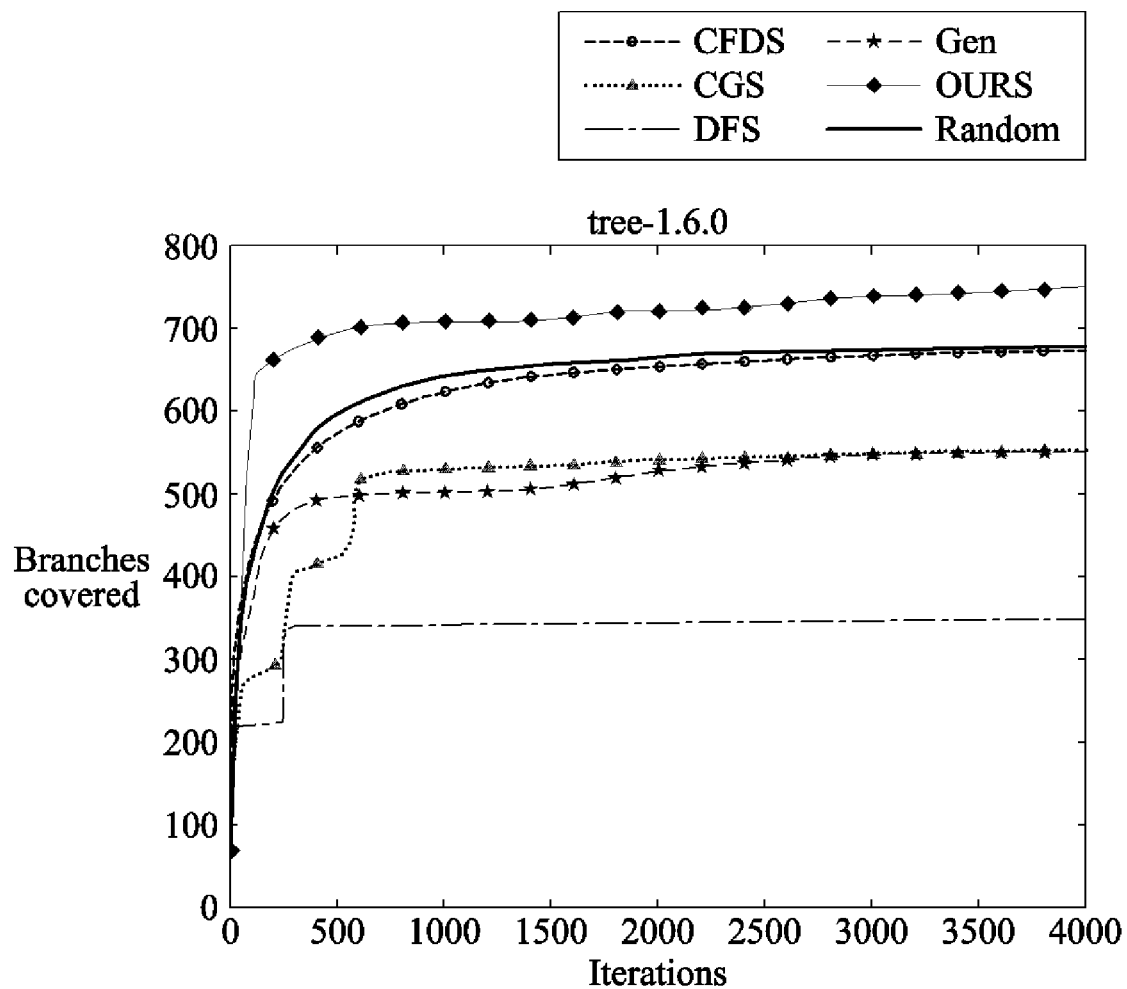

FIG. 9 is a flowchart illustrating a method of generating a search heuristic according to an embodiment of the invention. Referring to FIG. 1 and FIG. 9, the search heuristic generating module 132 can automatically generate a parameterized search heuristic to be used at the concolic testing tool 131. The search heuristic generating module 132 can receive the subject program as input and can generate a feature vector corresponding to each of the branches included in the subject program at every iteration of the subject program.

In step S210, the search heuristic generating module 132 can initialize the sample spaces that correspond to the dimensions of the feature vectors corresponding respectively to the branches included in the subject program. For example, the search heuristic generating module 132 can initialize the sample space of each dimension of the parameter vector for generating the parameter vector. The parameter vector can have the same dimensions as those of the feature vectors that correspond to the branches of the subject program respectively. The sample space for each dimension of the parameter vector can be set to be real numbers from −1 to 1 ([−1, 1]).

In step S220, the search heuristic generating module 132 can randomly generate first parameter vectors that have the same dimensions as the feature vectors and include components selected respectively from the sample spaces. For example, the search heuristic generating module 132 can generate a preset number (e.g. 1000) of first parameter vectors. The component for each dimension of each parameter vector can be randomly selected from the sample space ([−1, 1]) (Find step of FIG. 8).

In step S230, the search heuristic generating module 132 can select some of the first parameter vectors as second parameter vectors according to the sizes of the branch coverage of the first parameter vectors with respect to the subject program. For example, the search heuristic generating module 132 can measure the branch coverage for the subject program of each of the randomly generated first parameter vectors. That is, the search heuristic generating module 132 can execute the subject program by a set number of executions (e.g. 4000 times) with each of the first parameter vectors inputted and can measure the first branch coverage corresponding to each of the first parameter vectors. The search heuristic generating module 132 can select a particular number (e.g. 10) of second parameter vectors from the first parameter vectors in order of largest first branch coverage. In one example, the search heuristic generating module 132 can select the second parameter vectors as a particular percentage of the first parameter vectors in order of largest first branch coverage (e.g. having the top 10% first branch coverage). In one example, the search heuristic generating module 132 can select the parameter vectors of which the first branch coverage is larger than a reference coverage as the second parameter vectors (Find step of FIG. 8).

In step S240, the search heuristic generating module 132 can individually reduce the sample spaces based on the average branch coverage of each of the selected second parameter vectors. For example, the search heuristic generating module 132 can measure the branch coverage for each of the selected second parameter vectors by a particular number of times (e.g. 10 times) and calculate the average of the measured branch coverage sizes (average branch coverage of each second parameter vector). For example, the search heuristic generating module 132 can execute the subject program by a set number of executions (e.g. 4000 times) with each of the second parameter vectors inputted to measure the second branch coverage, and can measure the second branch coverage for each of the second parameter vectors by a particular number of times (e.g. 10 times). The search heuristic generating module 132 can calculate the average (average branch coverage) of the particular number (e.g. 10) of the second branch coverage sizes measured for each of the second parameter vectors. The search heuristic generating module 132 can select the two parameter vectors (a third and a fourth parameter vector) having the largest average branch coverage sizes from among the second parameter vectors (Check step of FIG. 8).

The search heuristic generating module 132 can compare the components of the selected third and fourth parameter vectors for each dimension. According to the comparison results, the search heuristic generating module 132 can reduce the sample space for each dimension of the parameter vector. For example, if the components for the same dimension of the third and fourth parameter vectors are both positive, then the lower limit of the sample space can be modified to the smaller of the two components. If the components for the same dimension of the third and fourth parameter vectors are both negative, then the upper limit of the sample space can be modified to the larger of the two components. If the components for the same dimension of the third and fourth parameter vectors have different signs, then the sample space can be left unchanged. As an example, supposing that the third parameter vector is <0.3, −0.6, 0.7> and the fourth parameter vector is <0.7, −0.2, −0.7>, then the sample space for the first dimension would become [min (0.3, 0.7), 1]=[0.3, 1], the sample space for the second dimension would become [−1, max(−0.6, −0.2)]=[−1, −0.2], and the sample space for the third dimension would be [−1, 1] (Refine step of FIG. 8).

In step S250, the search heuristic generating module 132 can check whether or not the average branch coverage of some of the second parameter vectors converges to a maximum. If the average branch coverage of some of the second parameter vectors converges to a maximum, then the process can move to step S260. If the average branch coverage of some of the second parameter vectors does not converge to a maximum, then steps S220 to S240 can be performed again.

For example, the search heuristic generating module 132 can store the maximum average branch coverage and the corresponding parameter vector from the previous execution. The search heuristic generating module 132 can compare the maximum average branch coverage of the current execution with the maximum average branch coverage of the previous execution. If the maximum average branch coverage of the current execution is greater than the maximum average branch coverage of the previous execution, then the search heuristic generating module 132 can store the maximum average branch coverage and the corresponding parameter vector of the current execution and repeat the steps of S220 to S240. If the maximum average branch coverage of the current execution is smaller than or equal to the maximum average branch coverage of the previous execution, then the search heuristic generating module 132 can proceed to step S260. When step S220 is being repeated, the components of the first parameter vectors can be selected from sample spaces that have been individually reduced in correspondence to the respective dimensions. Therefore, the average branch coverage can converge to a particular value.

In step S260, the search heuristic generating module 132 can output the optimal parameter vector with which the average branch coverage has converged to a maximum. For example, if the maximum average branch coverage of the current execution is smaller than or equal to the maximum average branch coverage of the previous execution, then the search heuristic generating module 132 can determine the parameter vector stored in the previous execution to be the final parameter vector. Thus, the search heuristic generating module 132 can generate an optimal parameter vector for use in the parameterized search heuristic.

FIG. 10A to 10F show graphs that illustrate the effect of concolic testing using a parameterized search heuristic according to an embodiment of the invention. Referring to FIG. 10A to 10F, each graph presents concolic testing results for various subject programs (vim-5.7, gawk-3.0.3, expat-2.1.0, grep-2.2, sed-1.17, tree-1.6.0). The lines in each of the graphs represent the performances of search heuristics used in the concolic testing. As can be seen in the graphs, the parameterized search heuristic of an embodiment of the invention exhibits consistent branch coverage results for various programs. In contrast, existing search heuristics (CFDS, CGS, DFS, Gen) are not able to show results that are consistent regardless of the subject program. The parameterized search heuristic according to an embodiment of the invention exhibits branch coverage performance that is improved over existing search heuristics.

Figure 11A:
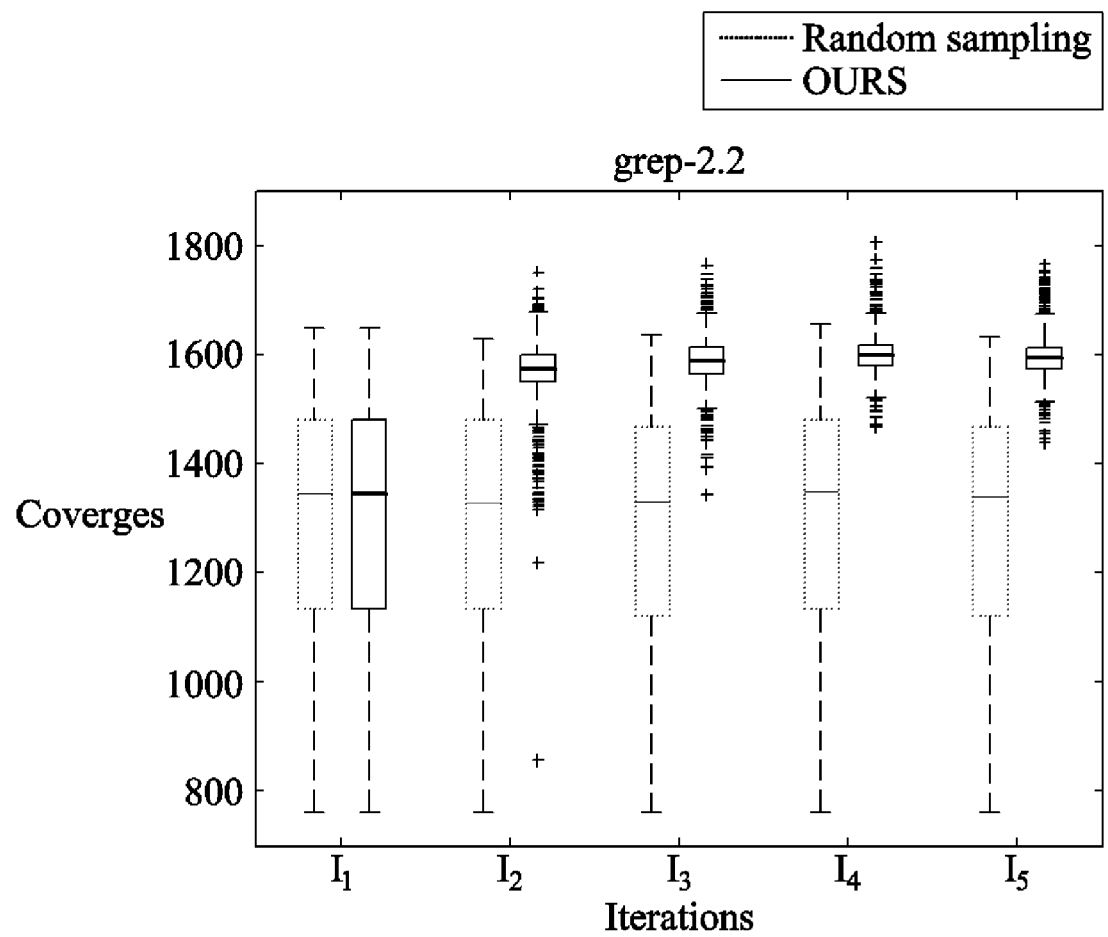
FIGS. 11A and 11B show diagrams that illustrate the effect of a method of generating a search heuristic according to an embodiment of the invention.
Figure 11B:
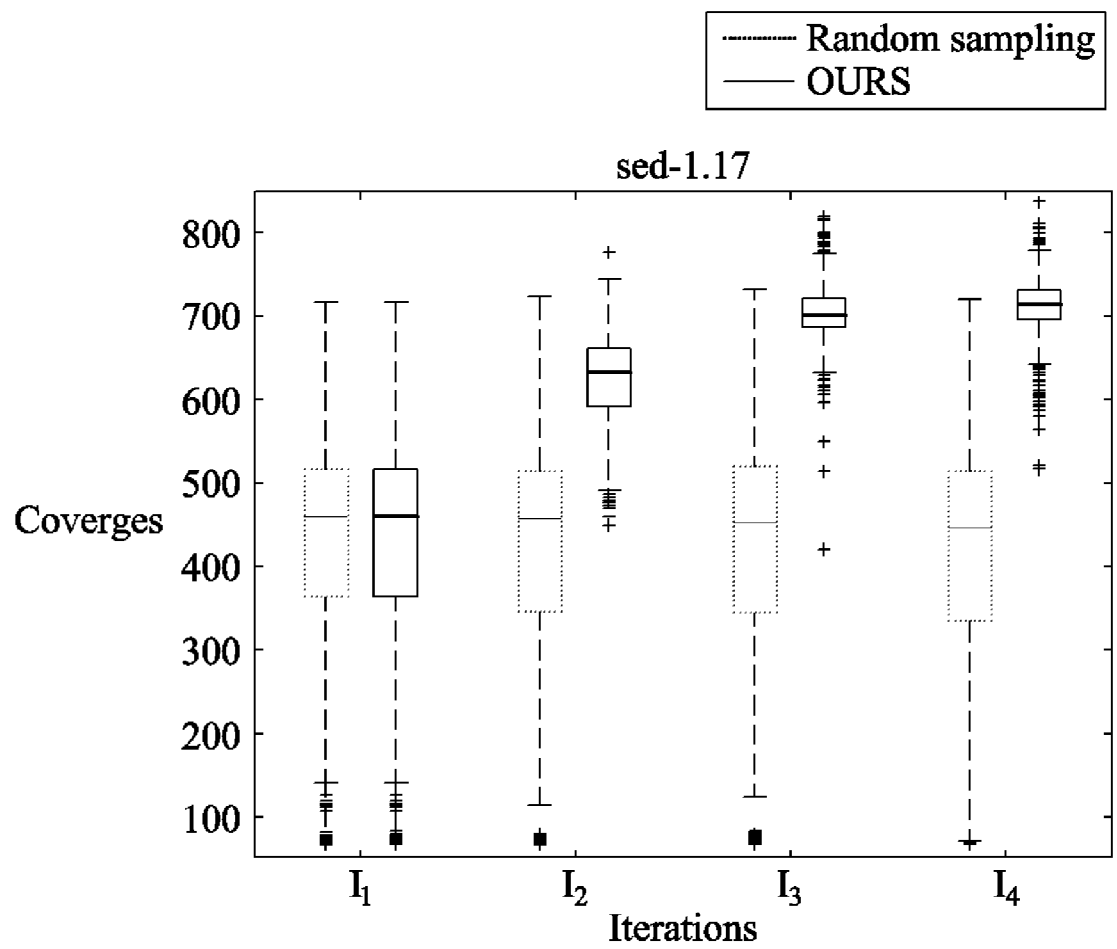

FIGS. 11A and 11B show diagrams that illustrate the effect of a method of generating a search heuristic according to an embodiment of the invention. Referring to FIGS. 11A and 11B, using a parameter optimization algorithm according to an embodiment of the invention (OURS) makes it possible to determine a parameter vector that offers higher performance compared to the case of using a random sampling algorithm (Random Sampling) in two aspects.

Firstly, with a parameter optimization algorithm according to an embodiment of the invention (OURS), the median of the branch coverage (middle line marked in the box) is raised with an increase in the number of search iterations of the parameter vector ($I_1$ to $I_5$). In contrast, with the random sampling algorithm (Random Sampling), the median of the branch coverage remains virtually unchanged regardless of the number of search iterations of the parameter vector. The median represents the average branch coverage of the generated parameter vectors. In other words, FIGS. 11A and 11B show that, with the parameter optimization algorithm according to an embodiment of the invention (OURS), an increased number of searches yield an increased probability of finding a parameter vector that provides superior performance.

Secondly, with a parameter optimization algorithm according to an embodiment of the invention (OURS), the branch coverage deviation (size of the box) of the parameter vector generated at each attempt is gradually decreased with an increase in the number of search iterations of the parameter vector ($I_1$ to $I_5$). In contrast, with the random sampling algorithm (Random Sampling), the branch coverage deviation of the parameter vector generated at each attempt remains virtually unchanged regardless of the number of search iterations of the parameter vector. The box marked for each attempt ($I_1$ to $I_5$) in FIGS. 11A and 11B represents the branch coverage where half of the generated parameter vectors are distributed.

Thus, from the graphs of FIGS. 11A and 11B, it can be ascertained the parameter optimization algorithm according to an embodiment of the invention (OURS) can, with increased numbers of iterations, generate an optimum parameter vector for the parameterized search heuristic.

While the spirit of the invention has been described in detail with reference to specific embodiments, the embodiments are for illustrative purposes only and do not limit the invention. It is to be appreciated that many variations and equivalent embodiments can be derived by those skilled in the art without departing from the scope and spirit of the invention. The true technical scope of the invention is to be defined by the technical spirit disclosed in the appended claims.

What is claimed is:

1. A method of concolic testing, the method comprising:
inputting a subject program and an initial input;
repeating the subject program execution by a set number of times using the initial input and a parameterized search heuristic; and
outputting a branch coverage for the subject program,
wherein the parameterized search heuristic comprises:
generating feature vectors corresponding respectively to branches included in the subject program;
calculating branch scores corresponding respectively to the branches by way of scalar products between the feature vectors and a predetermined parameter vector; and
selecting a branch corresponding to a maximum value of the branch scores,
and wherein the parameter vector is determined by a method for automatically generating a search heuristic based on the subject program.

2. The method of concolic testing according to claim 1, wherein the method for automatically generating a search heuristic comprises:

(a) generating the feature vectors and initializing sample spaces corresponding to respective dimensions of the feature vectors;

(b) randomly generating first parameter vectors, the first parameter vectors having same dimensions as the feature vectors and containing components selected respectively from the sample spaces;

(c) selecting second parameter vectors from among the first parameter vectors based on a size of a first branch coverage of each of the first parameter vectors for the subject program;

(d) reducing the sample spaces individually based on an average branch coverage of the second parameter vectors for the subject program;

(e) repeating said steps (b) to (d) such that the average branch coverage of some of the second parameter vectors converges to a maximum; and (f) if the average branch coverage converges to a maximum, outputting an optimal parameter vector corresponding to a maximum average branch coverage, and wherein components of the first parameter vectors are selected from sample spaces individually reduced in said step (d) when said step (b) is repeated.

3. The method of concolic testing according to claim 1, wherein the feature vectors are generated based on branch features, each of the branch features expressing a state of a branch as true or false.

4. The method of concolic testing according to claim 3, wherein the branch features comprise a static feature and a dynamic feature, the static feature determined regardless of an execution of the subject program, the dynamic feature determined in dependence on an execution of the subject program.

* * * * *